(12) United States Patent
Lee

(10) Patent No.: US 8,627,268 B2
(45) Date of Patent: Jan. 7, 2014

(54) SYSTEM AND METHOD FOR A NON-SEQUENTIAL UNDO MECHANISM

(75) Inventor: Robert Edward Lee, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1940 days.

(21) Appl. No.: 11/556,961

(22) Filed: Nov. 6, 2006

(65) Prior Publication Data
US 2008/0109831 A1   May 8, 2008

(51) Int. Cl.
- G06F 9/44 (2006.01)
- G06F 7/00 (2006.01)
- G06F 17/00 (2006.01)

(52) U.S. Cl.
USPC ............... 717/100; 707/683; 707/684

(58) Field of Classification Search
None
See application file for complete search history.

(56) References Cited

U.S. PATENT DOCUMENTS

| | | | | |
|---|---|---|---|---|
| 5,481,710 | A | 1/1996 | Keane et al. | 395/700 |
| 5,990,906 | A | 11/1999 | Hudson et al. | 345/439 |
| 6,167,451 | A | 12/2000 | Stracke, Jr. | 709/230 |
| 6,543,006 | B1 * | 4/2003 | Zundel et al. | 714/19 |
| RE38,270 | E | 10/2003 | Nakajima | 713/1 |
| 7,003,695 | B2 * | 2/2006 | Li | 714/19 |
| 7,277,900 | B1 * | 10/2007 | Ganesh et al. | 707/682 |
| 2002/0049926 | A1 * | 4/2002 | Korenshtein | 714/16 |
| 2003/0149941 | A1 | 8/2003 | Tsao | 715/530 |
| 2004/0006764 | A1 | 1/2004 | Van De Vanter et al. | 717/112 |
| 2004/0205663 | A1 | 10/2004 | Mohamed | 715/530 |
| 2004/0260974 | A1 * | 12/2004 | Livshits | 714/19 |

OTHER PUBLICATIONS

Berlage, Thomas. A Selective Undo Mechanism for Graphical User Interfaces Based on Command Objects. [online] (Sep. 1994). ACM, pp. 1-29. Retrieved From the Internet <http://portal.acm.org/citation.cfm?id=196721>.*

* cited by examiner

*Primary Examiner* — Emerson C Puente
*Assistant Examiner* — Jonathan R Labud
(74) *Attorney, Agent, or Firm* — Van Leeuwen & Van Leeuwen; Susan Murray

(57) ABSTRACT

A system and method for a non-sequential undo mechanism is presented. An action removal manager stores program states and action descriptions that it receives from a user in a program log corresponding to a software application. In turn, the action removal manager allows the user to remove an action from the program log without first removing actions subsequent to the action that, as a result, undoes an action to a file without undoing subsequent actions to the file. In one embodiment, the undo request includes a request to remove two or more actions from the program log. In this embodiment, the action removal manager evaluates the earliest action description to remove in the program log and then proceeds to evaluate subsequent action descriptions for removal.

28 Claims, 7 Drawing Sheets

SYSTEM AND METHOD FOR A NON-SEQUENTIAL UNDO MECHANISM

BACKGROUND OF THE INVENTION

1. Technical Field

The present invention relates to a system and method for a non-sequential undo mechanism. More particularly, the present invention relates to a system and method for removing a selected action from a program log without removing actions successive to the selected action from the program log that, as a result, undoes an action to a file without undoing subsequent actions to the file.

2. Description of the Related Art

Software applications use a program log to track user actions and resultant program states. For example, a document creation application's program log may store user actions such as text addition, text formatting, and page break insertions. The software application uses the program log to allow the user to "undo" prior user actions. For example, a user may have formatted a paragraph and wish to undo to the paragraph formatting.

A challenge found with existing art, however, is that existing art does not allow a user to remove a particular action that occurred after the particular action up to a current state. Using the example discussed above, if the user inserts a page break and enters text after the paragraph formatting, the software application must first undo the text addition and the page break before undoing the paragraph formatting. This approach is cumbersome to the user because the user has to "redo" many actions that had to be removed (e.g., rewrite text, etc.) due to the limited capabilities of existing art.

What is needed, therefore, is a system and method that allows a user to undo an action to a file without having to undo subsequent actions to the file.

SUMMARY

It has been discovered that the aforementioned challenges are resolved using a system, method, and program product for removing an action description from a program log without removing successive actions from the program log that, as a result, undoes an action to a file without undoing subsequent actions to the file. The system, method, and program product sequentially receive from a user a plurality of actions to modify a file. The plurality of actions include a "last received action," which is the last action received from the user. In turn, the system, method, and program product sequentially store a plurality of action descriptions in a program log. Each of the plurality of action descriptions corresponds to one of the plurality of actions in the order that the plurality of actions were received. As the plurality of actions are received, the system, method, and program product modify the file based upon the received actions. After modifying the file, the system, method, and program product receive an "undo request" that corresponds to a first action that occurred prior to the last received action. As a result, the system, method, and program product remove a first action description corresponding to the first action from the program log without removing a last action description that corresponds to the last action from the program log. In addition, the system, method, and program product modify the file by undoing the first action without undoing the last action.

In one embodiment, the system, method, and program product select a first program state that corresponds to the first action description, identify a second action description that is associated with a second program state, evaluate the first program state against the second action description, and associate the second action description to the first program state.

In one embodiment, the system, method, and program product select a third program state that is associated with a third action description, and updates the third program state based upon associating the second action description to the first program state. In this embodiment, the system, method, and program product may evaluate the updated third program state against the third action description, determine that the third action description is independent of the first action description, and associate the updated third program state to the third action description. In another embodiment, the system, method, and program product increments an independent action description counter in response to determining that the third action description is independent of the first action description.

In one embodiment, the system, method, and program product select a fourth program state that is associated with a fourth action description. The system, method, and program product then update the fourth program state in response to associating the updated third program state to the third action description, evaluates the updated fourth program state against the fourth action description, determines that the fourth action description is dependent upon the first action description, and remove the fourth action description from the program log.

In one embodiment, the system, method, and program product remove successive actions from the program log that are subsequent to the fourth action description in the program log, and sets a current state to the updated fourth program state.

In one embodiment, the system, method, and program product notify the user that the fourth action description is dependent upon the first action description, receives a response from the user in response to the notification, and removes the fourth action description from the program log based upon the user's response.

In one embodiment, the system, method, and program product receive an undo request that includes a request to remove the first action and a fourth action that corresponds to a fourth action description. In this embodiment, the system, method, and program product selects a fourth program state corresponding to the fourth action description, updates the fourth program state in response to associating the updated third program state to the third action description, selects a fifth action description that is successive to the fourth action description in the program log, evaluates the updated fourth program state against the fifth action description, determines that the fifth action description is independent from the first action description and the fourth action description, and associates the updated fourth program state to the fifth action description.

In one embodiment, the system, method, and program product selects a sixth program state that is associated with a sixth action description that is successive to the fifth action description, updates the sixth program state, evaluates the updated sixth program state against the sixth action description, determines that the sixth action description is dependent upon one of the requested actions to remove, removes the sixth action description from the program log, removes successive actions from the program log that are subsequent to the sixth action description, and sets a current state to the updated sixth program state.

In one embodiment, the system, method, and program product includes a plurality of actions that are each associated with a single software application and received from the user through a general user interface that displays the file.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
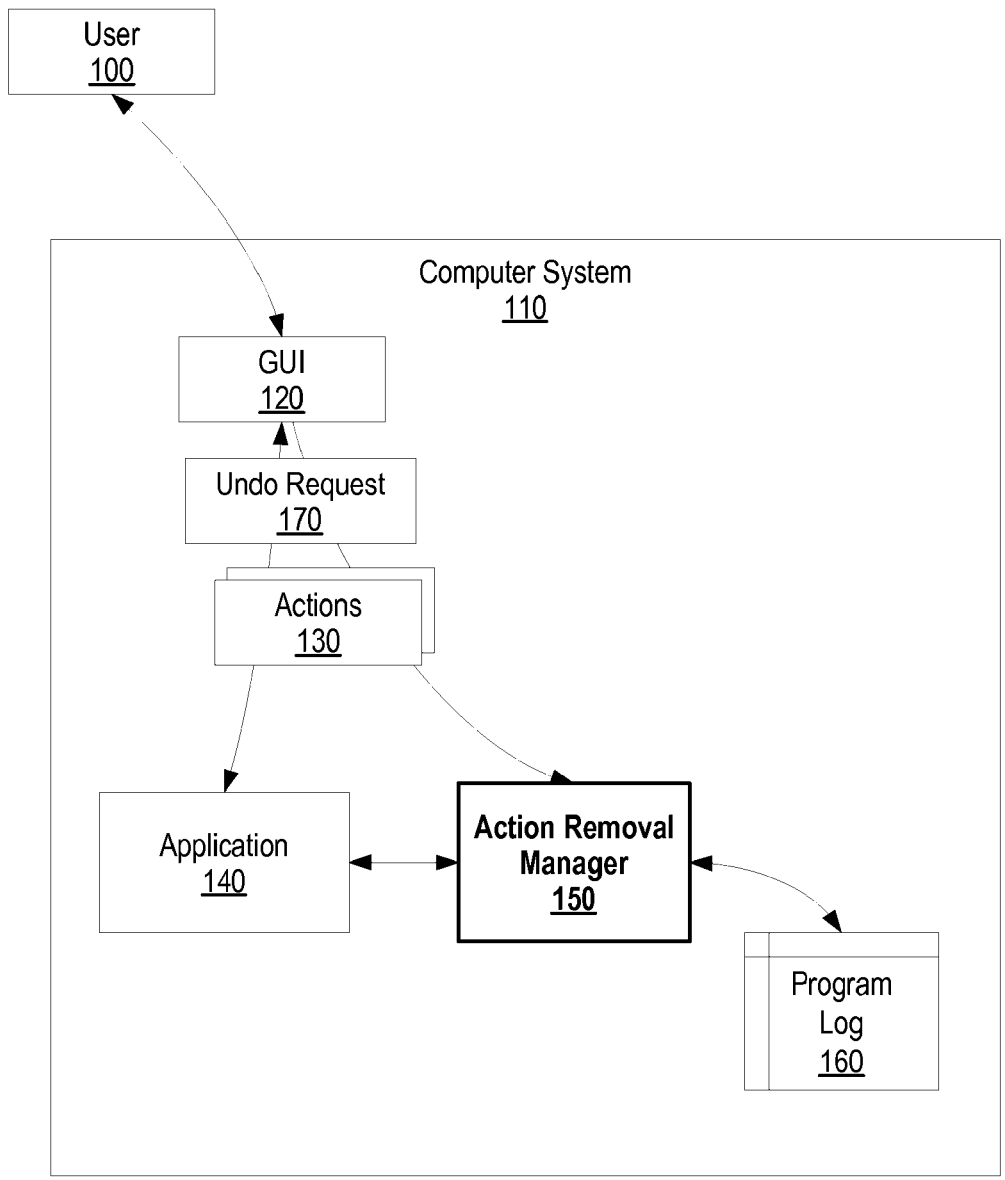
FIG. 1 is a diagram showing an action removal manager non-sequentially undoing an action in response to a user request.

FIG. 1 is a diagram showing an action removal manager non-sequentially undoing an action in response to a user request. Action removal manager 150 stores program states and action descriptions that it receives from user 100 in program log 160. Action removal manager 150 allows user 100 to non-sequentially undo an action by removing an action description from program log 160 without first removing action descriptions subsequent to the action. For example, a user may have bolded text and, after bolding text, performed other actions such as writing a paragraph, inserting page breaks, etc. In this example, the user is able to "undo" the bolding action without having to undo the added paragraph or inserted page break.

User 100 uses general user interface (GUI) 100 included in computer system 110 to provide actions 130 to computer system 110. Actions 130 may include actions such as mouse clicks, text deletions, text formatting, etc. GUI 120 provides actions 130 to application 140 and action removal manager 150. Application 140 may be a program such as a document generation program. Action removal manager 150 receives actions 130 and stores corresponding action descriptions, along with corresponding program states, in program log 160. Program log 160 may be stored on a volatile storage area, such as computer memory.

When user 100 wishes to remove an action (e.g., text formatting), user 100 uses GUI 120 to send undo request 170 to application 140 and action removal manager 150. In turn, action removal manager 150 identifies the action description to remove in program log 160 along with its corresponding program state. Next, action removal manager 150 proceeds through a series of steps to update successive program states and evaluate the updated program states against successive action descriptions.

The evaluation entails determining whether the successive action descriptions are independent of the requested action description to remove. When the successive action descriptions are independent, action removal manager 150 removes the requested action description from program log 160, updates the successive program states, and leaves the successive action descriptions in program log 160. When action removal manager 150 encounters a dependent action description, action removal manager 150 notifies user 100. In turn, user 100 instructs action removal manager 150 whether to continue with the undo request or cancel the undo request entirely (see FIG. 5 and corresponding text for further details).

In one embodiment, undo request 170 includes a request to remove two or more action descriptions from program log 160. In this embodiment, action removal manager 150 evaluates the earliest action description to remove in program log 160 and then proceeds to evaluate subsequent action descriptions for removal (see FIG. 3 and corresponding text for further details).

Figure 2:
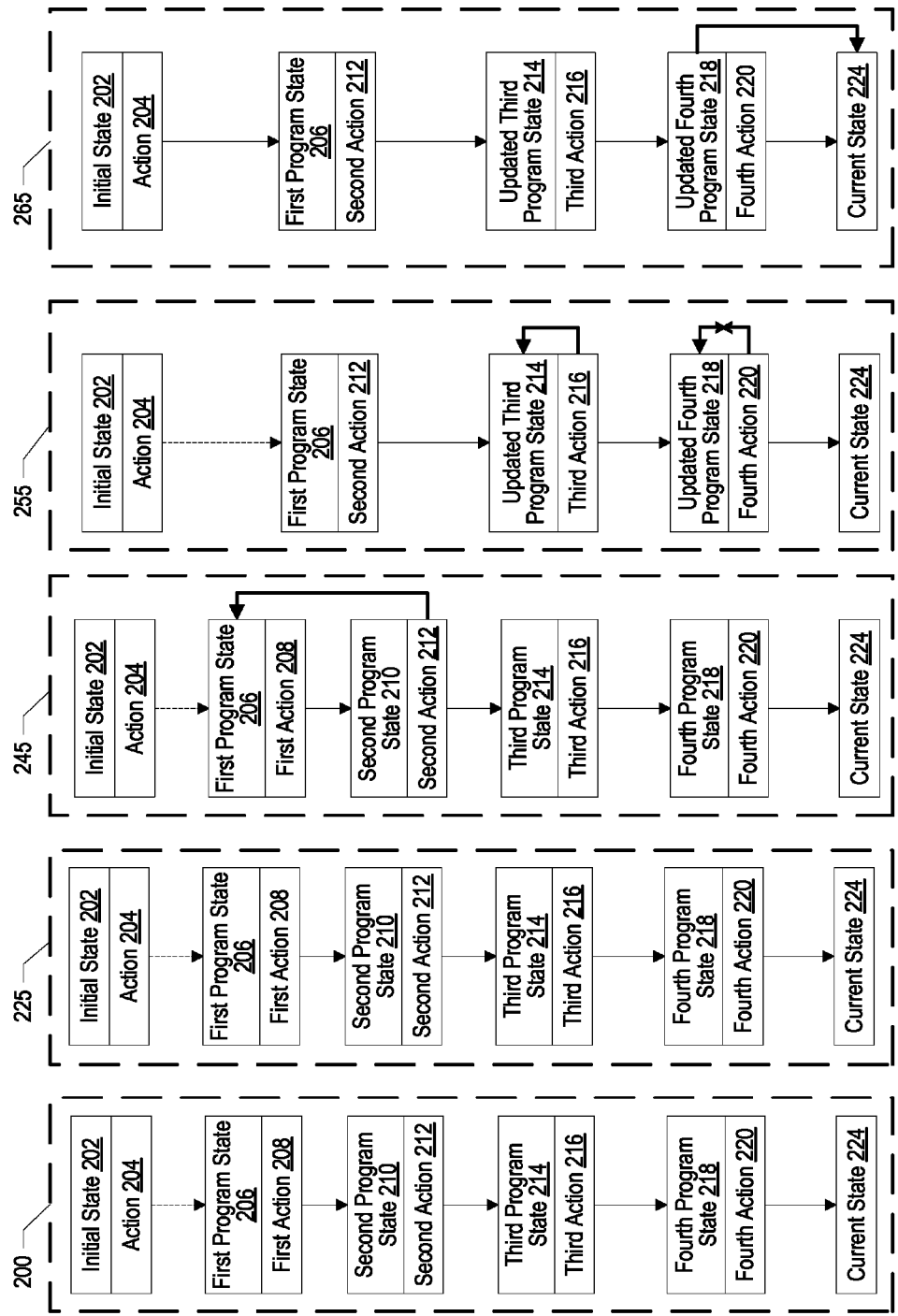
FIG. 2 is a diagram showing different stages of a program log while an action removal manager removes a non-sequential action description from the program log.

FIG. 2 is a diagram showing different stages of a program log while an action removal manager removes a non-sequential action description from the program log and undoes an action to a file. An action removal manager stores program states and action descriptions that it receives from a user in a program log. The action removal manager allows the user to remove an action description from the program log without first removing action descriptions subsequent to the action description. FIG. 2 shows various stages of the program log while removing an action description in a non-sequential manner.

Stage 200 includes various program states and corresponding action descriptions. The program log's initial stored state is initial state 202. When action description 204 occurs, a different program state results (first program state 206). During application execution, the program log stores various program states and corresponding action descriptions, such as program states 206, 210, 214, 218, and corresponding action descriptions 208, 212, 216, and 220, respectively. At a point in time, the application is at current state 224 waiting for a new user action description.

Stage 225 shows a user requesting to remove first action description 208 without removing action descriptions 212, 216, and 220. The action removal manager selects corresponding first program state 206 and evaluates it against the next successive action description, which is second action description 212 (shown in stage 245). The evaluation entails determining whether second action description 212 is dependent upon first action description 208. For example, first action description 208 may be typing a word and second action description 212 may be bolding the word. In this example, second action description 212 is dependent upon first action description 208. In another example, first action description 208 may be typing a word and second action description 212 may be inserting a page break. In this example, second action description 212 is independent of first action description 208.

When second action description 212 is independent of first action description 208, the action removal manager associates first program state 206 to second action description 212, which is shown in stage 255. Stage 255 also shows that the action removal manager updates third program state 214 based upon associating first program state 206 to second action description 212. The action removal manager evaluates updated third program state 214 against third action description 216 to determine whether third action description 216 is independent of the removed action description (first action description 208). If so, the action removal manager associates updated third program state 214 to third action description 216 (shown in stage 255).

The action removal manager proceeds to update fourth program state 218 and evaluate it against fourth action description 220. Stage 255 shows that during the evaluation, the action removal manager determined that fourth action description 220 is dependent upon first action description 208. As such, stage 265 shows that the action removal manager removes fourth action description 220 and sets current state 224 to updated fourth program state 218.

Figure 3:
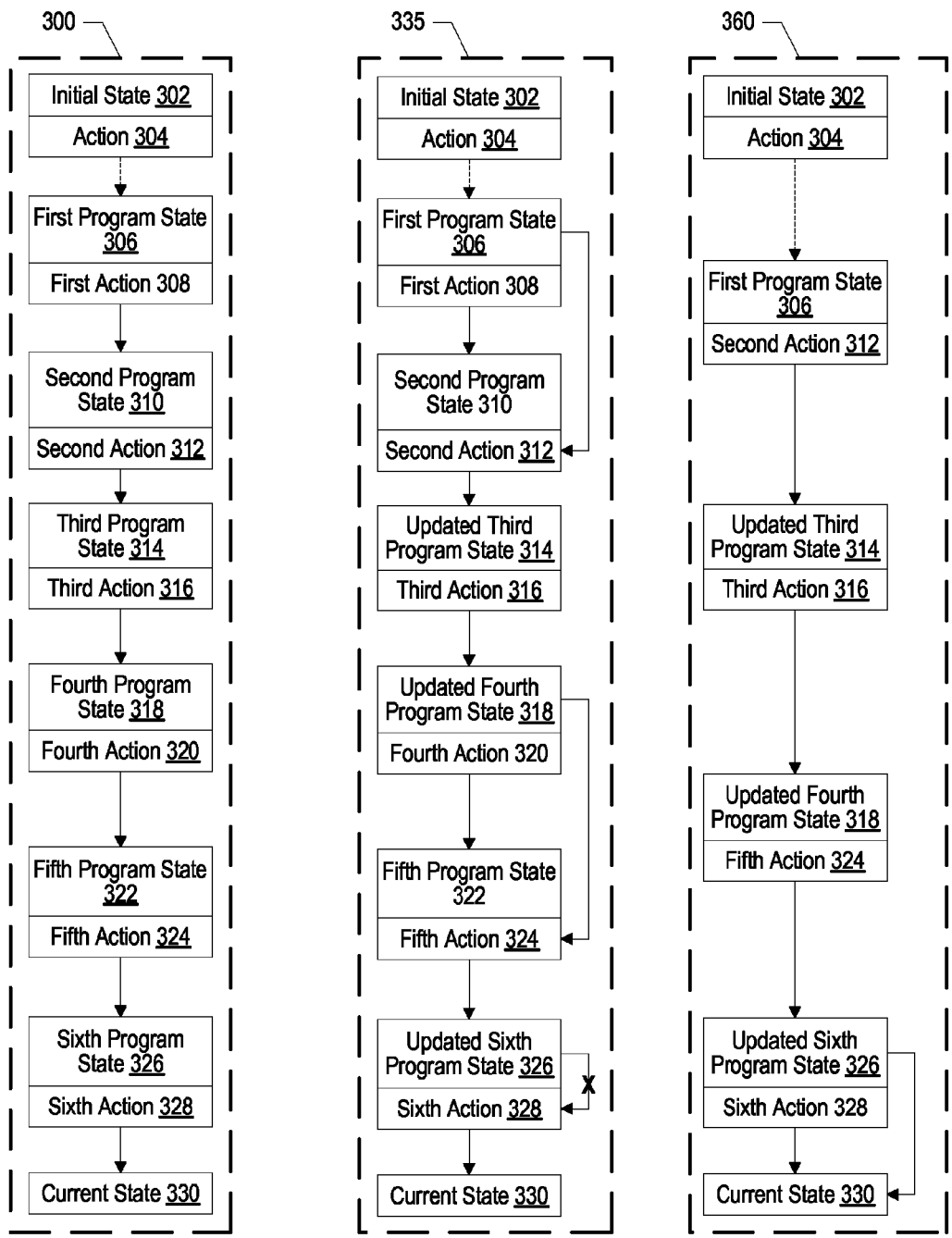
FIG. 3 is a flowchart showing steps taken in an action removal manager removing two non-sequential action descriptions from a program log.

FIG. 3 is a flowchart showing steps taken in an action removal manager removing two non-sequential action descriptions from a program log. FIG. 3 is similar to FIG. 2 with the exception that FIG. 3 shows the removal of two action descriptions as opposed to the removal of one action description.

Stage 300 includes program states 302, 306, 310, 314, 318, 322, and 326, with corresponding action descriptions 304, 308, 312, 316, 320, 324, and 328. Stage 300 also includes current state 330. A user wishes to remove first action description 308 and fourth action description 320. As such, stage 335 shows the action removal manager evaluating first program state 306 against second action description 312, which is independent of first action description 308. In turn, the action removal manager updates third program state 314 and evaluates it against third action description 316, which is also independent of first action description 308. As a result, the action removal manager updates fourth program state 318 and evaluates it against fifth action description 324 since the user wishes to remove fourth action description 320. Fifth action description 324 is independent of the removed action descriptions 308 and 322 and, therefore, the action removal manager updates sixth program state 326 and evaluates updated sixth program state 326 against sixth action description 328, which is, in fact, dependent upon first action description 308 or fourth action description 320.

Stage 360 shows the resulting program log of removing first action description 308 and fourth action description 320. As can be seen, first program state 306 is associated with second action description 312, updated third program state 314 is associated with third action description 316, and updated fourth program state 318 is associated with fifth action description 324. In addition, since sixth action description is dependent upon first action description 308 or fourth action description 320, the action removal manager sets current state 330 to updated sixth program state 326.

Figure 4:
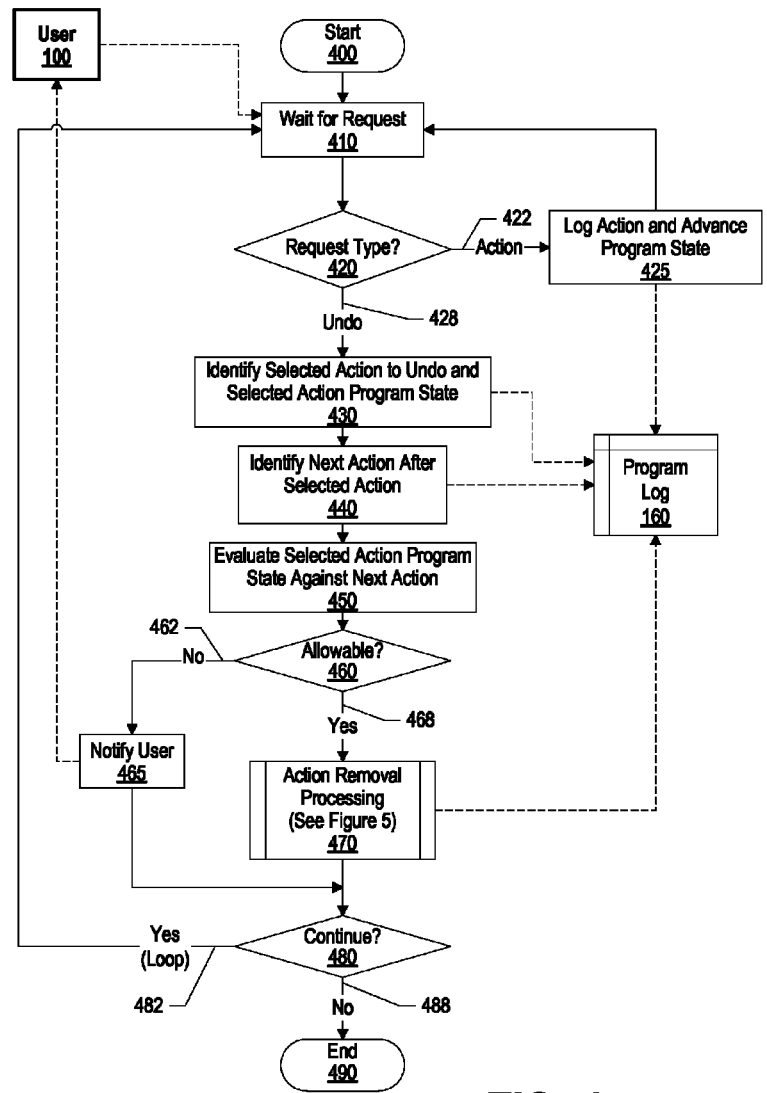
FIG. 4 is a high-level flowchart showing steps taken in removing a non-sequential action description from a program log.

FIG. 4 is a high-level flowchart showing steps taken in removing a non-sequential action description from a program log and undoing a corresponding action to a file. Processing commences at 400, whereupon processing waits for a request from user 100 at step 410. The request may be an action request, such as deleting a word in a document generation application, or the request may be an undo request. The undo request is a request to non-sequentially undo an action and remove a corresponding action description from a program log. User 100 is the same as that shown in FIG. 1.

A determination is made as to whether the request is an action request or an undo request (decision 420). If the request is an action request, decision 420 branches to "Action" branch 422 whereupon processing logs the action and advances the program state in program log 160 (step 425). For example, the action may bold particular text and, in this example, processing logs the bold action and advances the program state to account for the bolded text. Program log 160 is the same as that shown in FIG. 1.

On the other hand, if the request is an undo request, decision 420 branches to "Undo" branch 428 whereupon processing selects an action description to remove, along with its corresponding program state, in program log 160 that correspond with the undo request (step 430). For example, user 100 may wish to undo a fourth action on a file without undoing more recent actions.

At step 440, processing identifies an action description that is successive to the selected action description and, at step 450, processing evaluates the selected action description against the successive action description to determine whether the action description removal is allowable. A determination is made as to whether associating the selected action description's program state to the successive action description is allowable (decision 460). If not allowable, decision 460 branches to "No" branch 462 whereupon processing notifies user 100 at step 465.

Figure 5:
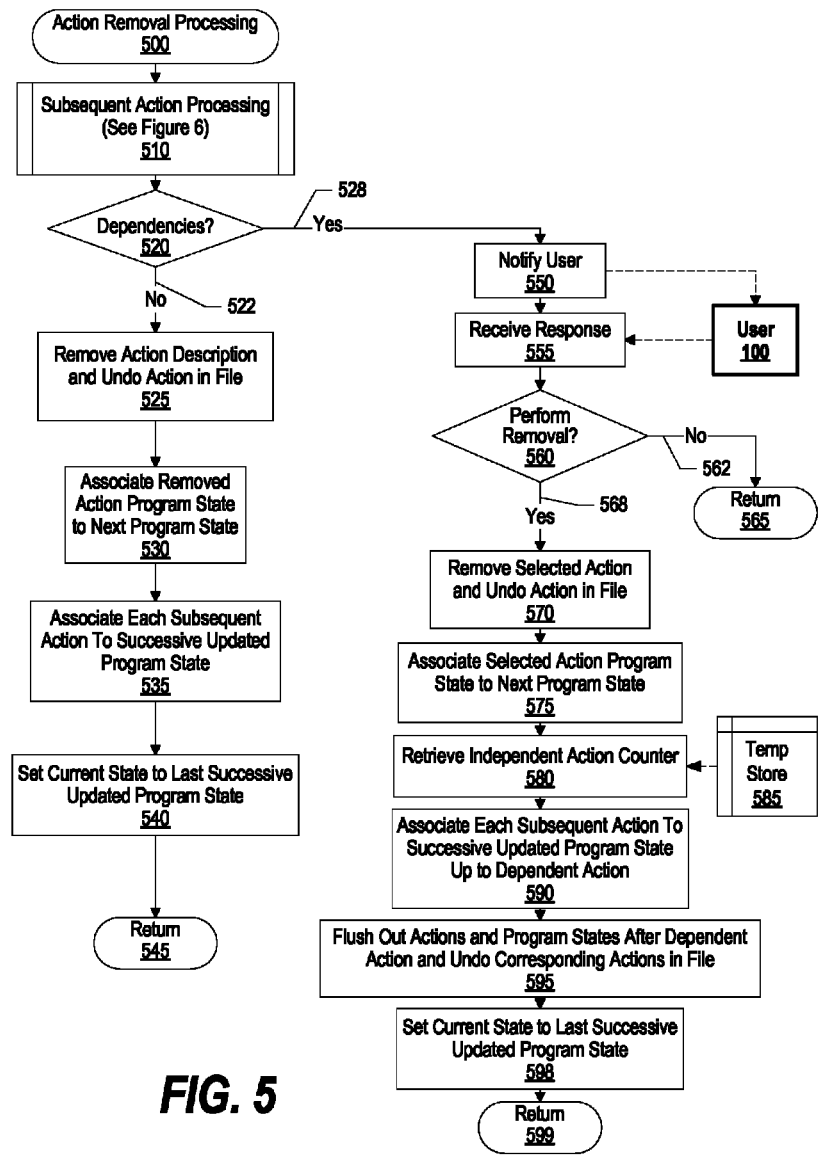
FIG. 5 is a flowchart showing steps taken in associating subsequent program states to subsequent action descriptions based upon their dependencies toward a removed action.

On the other hand, if associating the selected action description's program state to the successive action description is allowable, decision 460 branches to "Yes" branch 468 whereupon processing evaluates whether subsequent action descriptions are dependent upon the selected action description (pre-defined process block 470, see FIG. 5 and corresponding text for further details).

A determination is made as to whether to continue processing (decision 480). If processing should continue, decision 480 branches to "Yes" I branch 482 whereupon processing loops back to wait form more requests from user 100. This looping continues until processing should terminate, at which point decision 480 branches to "No" branch 488 whereupon processing ends at 490.

FIG. 5 is a flowchart showing steps taken in associating subsequent program states to subsequent action descriptions based upon their dependencies toward a removed action. Action removal processing commences at 500, whereupon processing evaluates subsequent action descriptions against updated program states to determine whether one of the corresponding subsequent actions is dependent upon an action that a user requests to remove from a program log. The subsequent actions occur at points in time after the requested action that the user wishes to remove (pre-defined process block 510, see FIG. 6 and corresponding text for further details).

A determination is made as to whether one of the subsequent action descriptions is dependent upon the user's corresponding selected action description to remove (decision 520). If there are no dependencies, decision 520 branches to "No" branch 522 whereupon processing removes the selected action description from the program log and modifies the file by undoing the corresponding action at step 525. At step 530, processing applies the selected action program state, which corresponds to the selected action description, to the next successive action description in the program log (see FIG. 2 and corresponding text for further details).

Processing associates each updated program state to a successive subsequent action description (step 535), and sets the current state to the last updated program state included in the program log at step 540 (see FIG. 2 and corresponding text for further details). Processing returns at 545.

When processing identifies that one of the subsequent action descriptions are dependent upon the selected action description, decision 520 branches to "Yes" branch 528 whereupon processing notifies user 100 at step 550. User 100 provides a response (step 555) and a determination is made as to whether user 100 wishes to cancel the entire undo request or to perform the undo request and update program states up to the dependent action description (decision 560). User 100 is the same as that shown in FIG. 1.

If user 100 requests to cancel the entire undo request, decision 560 branches to "No" branch 562 whereupon processing returns at 565. On the other hand, if user 100 requests to perform the undo request and update program states up to the dependent action description, decision 560 branches to "Yes" branch 568 whereupon processing removes the selected action description from the program log and modifies the file by undoing the corresponding action at step 570. At step 575, processing associates the selected action program state to the next action description.

In order to identify at which point to associate updated program states to successive subsequent action descriptions, processing retrieves an independent action description counter from temporary store 585 at step 580. The independent action description counter tracks which action descriptions, referenced at the selected action description, are independent of the selected action description (see FIG. 6 and corresponding text for further details). Temporary store 585 may be stored on a volatile storage area, such as computer memory.

Using the independent action description counter, processing associates each updated program state to successive subsequent action descriptions up to the dependent action description (step 590). In turn, processing flushes out actions and program states after the dependent action description, modifies the file accordingly (step 595), and sets the current state to the last updated program state (step 598). Processing returns at 599.

Figure 6:
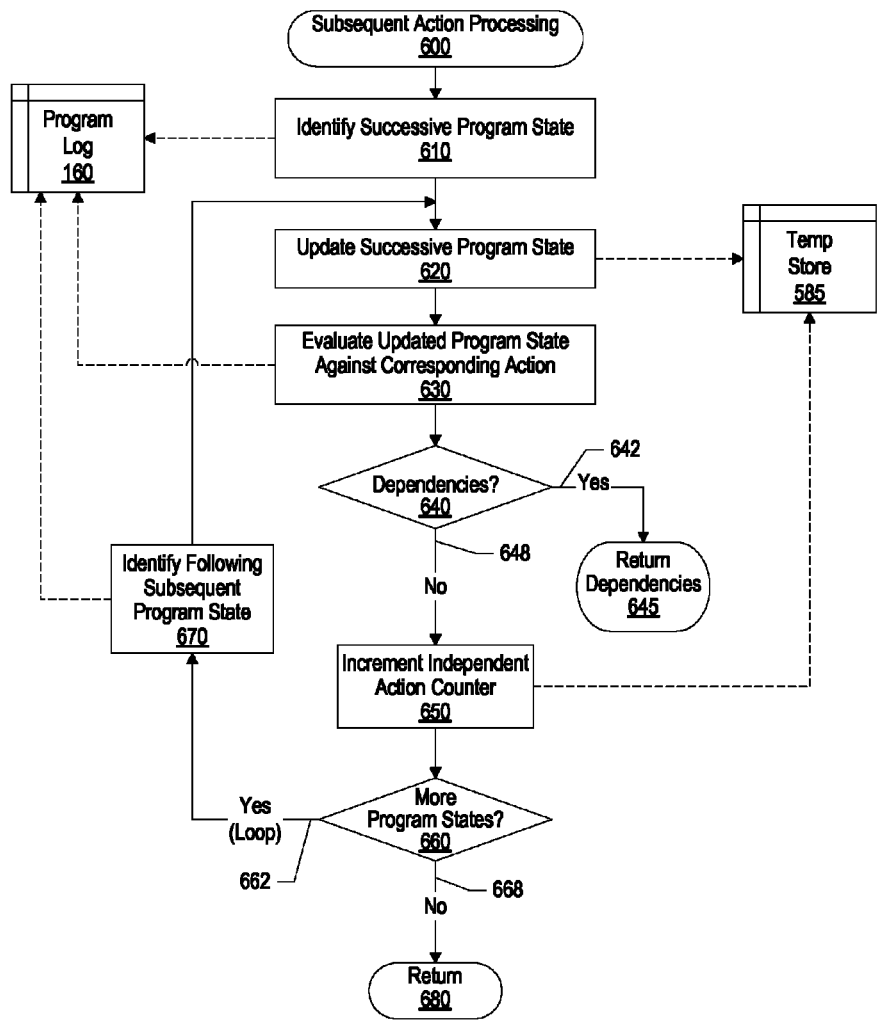
FIG. 6 is a flowchart showing steps taken in identifying subsequent action descriptions that are dependent upon an action description selected for removal.

FIG. 6 is a flowchart showing steps taken in identifying subsequent action descriptions that are dependent upon an action description selected for removal. A user selects an action to undo, and processing identifies whether a corresponding action description is removable by comparing the selected action description's program state to a following action description in the program log. When processing identifies that the selected action description is removable, processing proceeds through a series of steps to identify whether action descriptions successive to the following action description are dependent upon the selected action description to remove.

Subsequent action processing commences at 600, whereupon processing identifies a successive program state in program log 160 at step 610. At step 620, processing updates the successive program state and stores the updated program state in temporary store 585. Processing temporarily stores the updated program state because a user may not wish to proceed with undoing an action if processing determines that a subsequent action description depends upon the selected action description to remove. Temporary store 585 is the same as that shown in FIG. 5.

At step 630, processing evaluates the updated program state against its corresponding action description. A determination is made as to whether the subsequent action description is dependent upon the selected action description (decision 640). If the subsequent action description is dependent upon the selected action description to remove, decision 640 branches to "Yes" branch 642 whereupon processing returns at 645.

On the other hand, if the subsequent action description is not dependent upon the selected action to remove, decision 640 branches to "No" branch 648 whereupon processing increments an independent action description counter in temporary store 585 at step 650. The independent action description counter tracks how many action descriptions subsequent to the selected action description are independent such that if a dependent action description is identified, processing is able to update program states up to the dependent action description. For example, if five action descriptions subsequent to the selected action description are independent and the sixth action description is dependent, processing is able to remove the selected action description, update the program states for the five independent action descriptions, and flush out the program states thereafter, leaving the current state as the fifth updated program state.

A determination is made as to whether there are more program states to evaluate (decision 660). If there are more program states to evaluate, decision 660 branches to "Yes" branch 662 which loops back to identify (step 670) and process the next subsequent program state. This looping continues until there are no more program states to identify, at which point decision 660 branches to "No" branch 668 and processing returns at 680.

Figure 7:
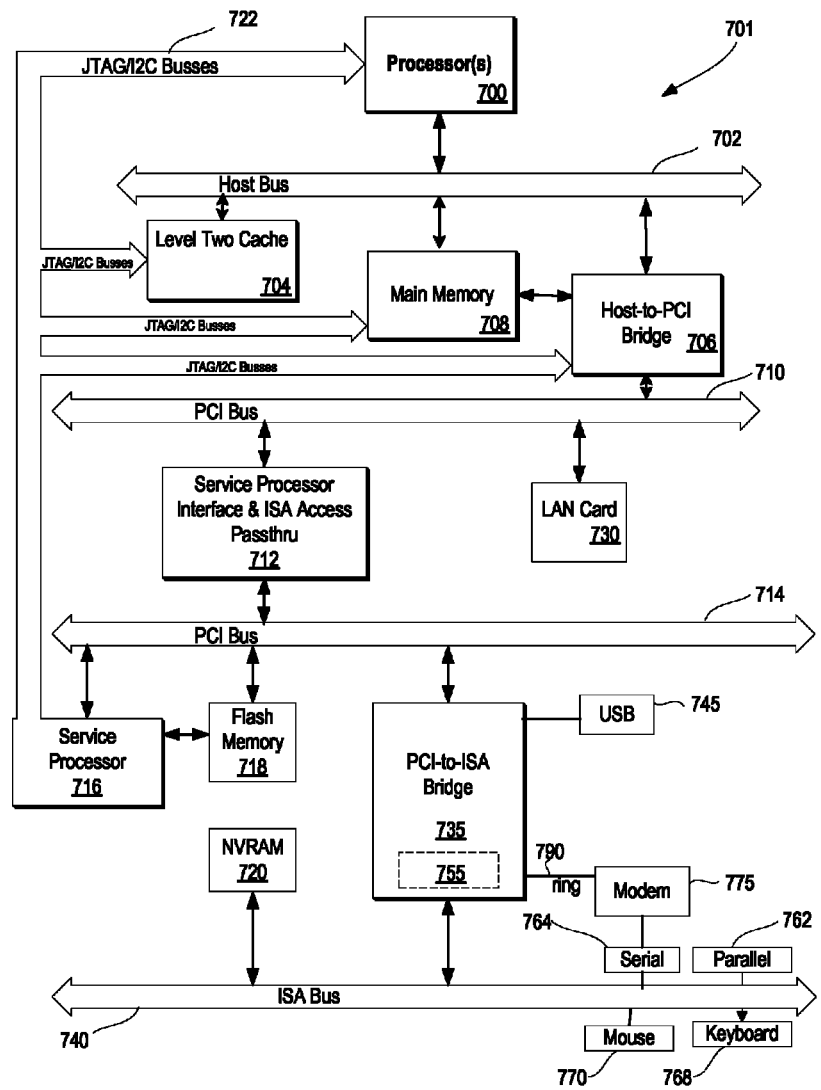
FIG. 7 is a block diagram of a computing device capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While FIG. 7 shows one information handling system that employs processor(s) 700, the information handling system may take many forms. For example, information handling system 701 may take the form of a desktop, server, portable, laptop, notebook, or other form factor computer or data processing system. Information handling system 701 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   sequentially receiving from a user a plurality of actions to modify a file, the plurality of actions including a first action, a second action, a third action, and a last received action, wherein the third action is successive to the second action, the second action is successive to the first action, and the last received action is the last action received from the user;
   sequentially storing a plurality of action descriptions in a program log, wherein each of the plurality of action descriptions correspond to one of the plurality of actions in the order that the plurality of actions were received, the plurality of action descriptions including a first action description, a second action description, and a third action description that correspond to the first action, the second action, and the third action, respectively;
   modifying the file by executing the plurality of actions in the order that they are received, the modifying further comprising:
      storing a first program state in the program log, the first program state corresponding to the file prior to executing the first action;
      storing a second program state in the program log, the second program state corresponding to the file after executing the first action; and
      storing a third program state in the program log, the third program state corresponding to the file after executing the second action;
   receiving, after the modifying, an undo request corresponding to the first action;
   in response to receiving the undo request, the method further comprises:
      removing the first action description from the program log without removing the last action description;
      associating the second action description to the first program state in response to removing the first action description from the program log;
      updating the third program state in response to associating the second action description to the first program state, the updating resulting in an updated third program state;
      determining whether the third action description is independent of the first action description;
      in response to determining that the third action description is independent of the first action description, associating the updated third program state to the third action description;
      in response to determining that the third action description is dependent upon the first action description, removing the third action description from the program log; and
      modifying the file by undoing the first action without undoing the last action.

2. The method of claim 1 further comprising:
   selecting a fourth program state that is associated with a fourth action description, the fourth action description successive to the third action description in the program log;
   updating the fourth program state in response to the association of the updated third program state to the third action description, resulting in an updated fourth program state;
   evaluating the updated fourth program state against the fourth action description;
   determining, based upon the evaluation of the updated fourth program state against the fourth action description, that the fourth action description is dependent upon the first action description; and removing the fourth action description from the program log in response to the determination that the fourth action description is dependent upon the first action description.

3. The method of claim 1 further comprising:
incrementing an independent action description counter in response to the determination that the third action description is independent of the first action description.

4. The method of claim 2 further comprising:
in response to removing the fourth action description from the program log, removing successive action descriptions from the program log that are subsequent to the fourth action description in the program log; and
setting a current state to the updated fourth program state in response to the removal of the successive action descriptions from the program log that are subsequent to the fourth action description.

5. The method of claim 2 further comprising:
notifying the user that the fourth action description is dependent upon the first action description;
receiving a response from the user in response to the notifying; and
performing the removal of the fourth action description from the program log based upon the response.

6. The method of claim 1 wherein the undo request includes a request to remove the first action and a fourth action that corresponds to a fourth action description, the fourth action description successive to the third action description in the program log, the method further comprising:
selecting a fourth program state corresponding to the fourth action description;
updating the fourth program state in response to the association of the updated third program state to the third action description;
selecting a fifth action description that is successive to the fourth action description in the program log;
evaluating the updated fourth program state against the fifth action description;
determining, based upon the evaluation of the updated fourth program state against the fifth action description, that the fifth action description is independent from the first action description and the fourth action description; and
associating the updated fourth program state to the fifth action description in response to the determination that the fifth action description is independent from the first action description and the fourth action description.

7. The method of claim 6 further comprising:
selecting a sixth program state that is associated with a sixth action description, the sixth action description successive to the fifth action description in the program log;
in response to the association of the updated fourth program state to the fifth action description, updating the sixth program state;
evaluating the updated sixth program state against the sixth action description;
determining, based upon the evaluation of the updated sixth program state against the sixth action description, that the sixth action description is dependent upon one of the requested action descriptions to remove;
removing the sixth action description from the program log in response to the determination that the sixth action description is dependent upon one of the requested action descriptions to remove;
in response to removing the sixth action description from the program log, removing successive action descriptions from the program log that are subsequent to the sixth action description; and
setting a current state to the updated sixth program state in response to the removal of the successive action descriptions from the program log that are subsequent to the sixth action description.

8. The method of claim 1 wherein each of the plurality of actions is associated with a single software application and received from the user through a general user interface that displays the file.

9. An information handling system comprising:
one or more processors;
a memory accessible by the processors;
one or more non-volatile storage devices accessible by the processors; and
an action removal tool for removing an action description from a program log located in the memory, the action removal tool being effective to:
sequentially receiving from a user a plurality of actions to modify a file located in the memory, the plurality of actions including a first action, a second action, a third action, and a last received action, wherein the third action is successive to the second action, the second action is successive to the first action, and the last received action is the last action received from the user;
sequentially storing a plurality of action descriptions in a program log located in the memory, wherein each of the plurality of action descriptions correspond to one of the plurality of actions in the order that the plurality of actions were received, the plurality of action descriptions including a first action description, a second action description, and a third action description that correspond to the first action, the second action, and the third action, respectively;
modifying the file by executing the plurality of actions in the order that they are received, the modifying further comprising:
storing a first program state in the program log, the first program state corresponding to the file prior to executing the first action;
storing a second program state in the program log, the second program state corresponding to the file after executing the first action; and
storing a third program state in the program log, the third program state corresponding to the file after executing the second action;
receiving, after the modifying, an undo request corresponding to the first action;
in response to receiving the undo request, the method further comprises:
removing the first action description from the program log without removing the last action description;
associating the second action description to the first program state in response to removing the first action description from the program log;
updating the third program state in response to associating the second action description to the first program state, the updating resulting in an updated third program state;
determining whether the third action description is independent of the first action description;
in response to determining that the third action description is independent of the first action description, associating the updated third program state to the third action description;

in response to determining that the third action description is dependent upon the first action description, removing the third action description from the program log; and modifying the file by undoing the first action without undoing the last action.

10. The information handling system of claim 9 wherein the action removal tool is further effective to:

select a third program state located in the memory that is associated with a third action description, the third action description successive to the second action description in the program log; and update the third program state based upon the association of the second action description to the first program state, the updating resulting in an updated third program state.

11. The information handling system of claim 10 wherein the action removal tool is further effective to:

evaluate the updated third program state against the third action description;

determine, based upon the evaluation of the updated third program state against the third action description, that the third action description is independent of the first action description; and associate the updated third program state to the third action description in response to the determination that the third action description is independent of the first action description.

12. The information handling system of claim 9 wherein the action removal tool is further effective to:

select a fourth program state located in the memory that is associated with a fourth action description, the fourth action description successive to the third action description in the program log;

update the fourth program state in response to the association of the updated third program state to the third action description, resulting in an updated fourth program state;

evaluate the updated fourth program state against the fourth action description;

determine, based upon the evaluation of the updated fourth program state against the fourth action description, that the fourth action description is dependent upon the first action description; and remove the fourth action description from the program log in response to the determination that the fourth action description is dependent upon the first action description.

13. The information handling system of claim 9 wherein the action removal tool is further effective to:

increment an independent action description counter located in the memory in response to the determination that the third action description is independent of the first action description.

14. The information handling system of claim 12 wherein the action removal tool is further effective to:

in response to removing the fourth action description from the program log, remove successive action descriptions from the program log that are subsequent to the fourth action description in the program log; and set a current state to the updated fourth program state in response to the removal of the successive action descriptions from the program log that are subsequent to the fourth action description.

15. The information handling system of claim 12 wherein the action removal tool is further effective to:

notify the user that the fourth action description is dependent upon the first action description;

receive a response from the user in response to the notifying; and perform the removal of the fourth action description from the program log based upon the response.

16. The information handling system of claim 11 wherein the undo request includes a request to remove the first action and a fourth action that corresponds to a fourth action description, the fourth action description successive to the third action description in the program log, the action removal tool further effective to:

select a fourth program state located in the memory corresponding to the fourth action description;

update the fourth program state in response to the association of the updated third program state to the third action description;

select a fifth action description that is successive to the fourth action description in the program log;

evaluate the updated fourth program state against the fifth action description;

determine, based upon the evaluation of the updated fourth program state against the fifth action description, that the fifth action description is independent from the first action description and the fourth action description; and associate the updated fourth program state to the fifth action description in response to the determination that the fifth action description is independent from the first action description and the fourth action description.

17. The information handling system of claim 16 wherein the action removal tool is further effective to:

select a sixth program state located in the memory that is associated with a sixth action description, the sixth action description successive to the fifth action description in the program log;

in response to the association of the updated fourth program state to the fifth action description, update the sixth program state;

evaluate the updated sixth program state against the sixth action description;

determine, based upon the evaluation of the updated sixth program state against the sixth action description, that the sixth action description is dependent upon one of the requested action descriptions to remove;

remove the sixth action description from the program log in response to the determination that the sixth action description is dependent upon one of the requested action descriptions to remove;

in response to removing the sixth action description from the program log, remove successive action descriptions from the program log that are subsequent to the sixth action description; and set a current state to the updated sixth program state in response to the removal of the successive action descriptions from the program log that are subsequent to the sixth action description.

18. The information handling system of claim 9 wherein each of the plurality of actions is associated with a single software application and received from the user through a general user interface that displays the file.

19. A computer program product stored on a computer memory, the computer memory containing instructions for execution by a computer, which, when executed by the computer, cause the computer to implement a method for removing actions from a program log, the method comprising:

sequentially receiving from a user a plurality of actions to modify a file, the plurality of actions including a first action, a second action, a third action, and a last received action, wherein the third action is successive to the second action, the second action is successive to the first action, and the last received action is the last action received from the user;

sequentially storing a plurality of action descriptions in a program log, wherein each of the plurality of action descriptions correspond to one of the plurality of actions in the order that the plurality of actions were received, the plurality of action descriptions including a first action description, a second action description, and a third action description that correspond to the first action, the second action, and the third action, respectively;

modifying the file by executing the plurality of actions in the order that they are received, the modifying further comprising:
  storing a first program state in the program log, the first program state corresponding to the file prior to executing the first action;
  storing a second program state in the program log, the second program state corresponding to the file after executing the first action; and
  storing a third program state in the program log, the third program state corresponding to the file after executing the second action;

receiving, after the modifying, an undo request corresponding to the first action;

in response to receiving the undo request, the method further comprises:
  removing the first action description from the program log without removing the last action description;
  associating the second action description to the first program state in response to removing the first action description from the program log;
  updating the third program state in response to associating the second action description to the first program state, the updating resulting in an updated third program state;
  determining whether the third action description is independent of the first action description;
  in response to determining that the third action description is independent of the first action description, associating the updated third program state to the third action description;
  in response to determining that the third action description is dependent upon the first action description, removing the third action description from the program log; and
  modifying the file by undoing the first action without undoing the last action.

20. The computer program product of claim 19 wherein the method further comprises:
  selecting a third program state that is associated with a third action description, the third action description successive to the second action description in the program log; and
  updating the third program state based upon the association of the second action description to the first program state, the updating resulting in an updated third program state.

21. The computer program product of claim 20 wherein the method further comprises:
  evaluating the updated third program state against the third action description;
  determining, based upon the evaluation of the updated third program state against the third action description, that the third action description is independent of the first action description; and
  associating the updated third program state to the third action description in response to the determination that the third action description is independent of the first action description.

22. The computer program product of claim 19 wherein the method further comprises:
  selecting a fourth program state that is associated with a fourth action description, the fourth action description successive to the third action description in the program log;
  updating the fourth program state in response to the association of the updated third program state to the third action description, resulting in an updated fourth program state;
  evaluating the updated fourth program state against the fourth action description;
  determining, based upon the evaluation of the updated fourth program state against the fourth action description, that the fourth action description is dependent upon the first action description; and
  removing the fourth action description from the program log in response to the determination that the fourth action description is dependent upon the first action description.

23. The computer program product of claim 19 wherein the method further comprises:
  incrementing an independent action description counter in response to the determination that the third action description is independent of the first action description.

24. The computer program product of claim 22 wherein the method further comprises:
  in response to removing the fourth action description from the program log, removing successive action descriptions from the program log that are subsequent to the fourth action description in the program log; and
  setting a current state to the updated fourth program state in response to the removal of the successive action descriptions from the program log that are subsequent to the fourth action description.

25. The computer program product of claim 22 wherein the method further comprises:
  notifying the user that the fourth action description is dependent upon the first action description;
  receiving a response from the user in response to the notifying; and
  performing the removal of the fourth action description from the program log based upon the response.

26. The computer program product of claim 21 wherein the undo request includes a request to remove the first action and a fourth action that corresponds to a fourth action description, the fourth action description successive to the third action description in the program log, the method further comprising:
  selecting a fourth program state corresponding to the fourth action description;
  updating the fourth program state in response to the association of the updated third program state to the third action description;
  selecting a fifth action description that is successive to the fourth action description in the program log;
  evaluating the updated fourth program state against the fifth action description;

determining, based upon the evaluation of the updated fourth program state against the fifth action description, that the fifth action description is independent from the first action description and the fourth action description; and associating the updated fourth program state to the fifth action description in response to the determination that the fifth action description is independent from the first action description and the fourth action description.

27. The computer program product of claim 26 wherein the method further comprises:

selecting a sixth program state that is associated with a sixth action description, the sixth action description successive to the fifth action description in the program log;

in response to the association of the updated fourth program state to the fifth action description, updating the sixth program state;

evaluating the updated sixth program state against the sixth action description;

determining, based upon the evaluation of the updated sixth program state against the sixth action description, that the sixth action description is dependent upon one of the requested action descriptions to remove;

removing the sixth action description from the program log in response to the determination that the sixth action description is dependent upon one of the requested action descriptions to remove;

in response to removing the sixth action description from the program log, removing successive action descriptions from the program log that are subsequent to the sixth action description; and setting a current state to the updated sixth program state in response to the removal of the successive action descriptions from the program log that are subsequent to the sixth action description.

28. The computer program product of claim 19 wherein each of the plurality of actions is associated with a single software application and received from the user through a general user interface that displays the file.

* * * * *